United States Patent
Becerra et al.

(10) Patent No.: US 8,917,042 B2
(45) Date of Patent: Dec. 23, 2014

(54) METHODS AND SYSTEMS FOR REDUCING CONDUCTED ELECTROMAGNETIC INTERFERENCE

(75) Inventors: Roger Carlos Becerra, Fort Wayne, IN (US); Yao Da, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 171 days.

(21) Appl. No.: 13/609,669

(22) Filed: Sep. 11, 2012

(65) Prior Publication Data

US 2014/0070744 A1 Mar. 13, 2014

(51) Int. Cl.
*H02P 6/00* (2006.01)

(52) U.S. Cl.
USPC ............... 318/400.24; 318/722; 318/254.2; 318/438

(58) Field of Classification Search
USPC ............ 318/400.24, 722, 254.2, 438; 363/35, 363/37, 44, 45, 48, 142, 143; 361/56, 58, 361/118
See application file for complete search history.

(56) References Cited

U.S. PATENT DOCUMENTS

| | | | |
|---|---|---|---|
| 4,473,790 A * | 9/1984 | Plunkett et al. | 318/298 |
| 5,598,326 A * | 1/1997 | Liu et al. | 363/34 |
| 5,631,814 A * | 5/1997 | Zak | 363/37 |
| 5,969,583 A | 10/1999 | Hutchison | |
| 5,986,419 A * | 11/1999 | Archer et al. | 318/400.02 |
| 5,994,869 A * | 11/1999 | Becerra | 318/729 |
| 6,583,682 B1 | 6/2003 | Dubhashi et al. | |
| 6,809,912 B2 * | 10/2004 | Hu et al. | 361/58 |
| 7,180,389 B2 | 2/2007 | Wang et al. | |
| 7,276,859 B1 | 10/2007 | Trestman | |
| 7,443,125 B2 * | 10/2008 | Clothier et al. | 318/701 |
| 7,999,633 B2 | 8/2011 | Xu et al. | |
| 8,030,862 B2 | 10/2011 | Archer | |
| 8,441,237 B2 * | 5/2013 | Schmid et al. | 323/223 |
| 8,476,873 B2 * | 7/2013 | Green | 323/207 |
| 8,587,280 B2 * | 11/2013 | Colbeck et al. | 323/282 |
| 2011/0037444 A1 | 2/2011 | Wildash | |
| 2011/0199751 A1 | 8/2011 | Ho | |

* cited by examiner

*Primary Examiner* — Bentsu Ro
*Assistant Examiner* — Thai Dinh
(74) *Attorney, Agent, or Firm* — Armstrong Teasdale LLP

(57) ABSTRACT

A drive circuit is provided for reducing conducted electromagnetic interference provided by a power line to a motor controller. The power line includes a first alternating current (AC) line output and a second AC line output. The drive circuit includes an EMI filter having a first input terminal, a second input terminal, a first output terminal, and a second output terminal. The first input terminal is configured to be coupled to the first AC line output and the second input terminal is configured to be coupled to the second AC line output. The drive circuit further includes at least two series-coupled filter capacitors positioned after the EMI filter and a power factor correction (PFC) choke. The PFC choke is coupled at a first end to the second output terminal and at a second end between the series-coupled filter capacitors.

17 Claims, 5 Drawing Sheets

US 8,917,042 B2

METHODS AND SYSTEMS FOR REDUCING CONDUCTED ELECTROMAGNETIC INTERFERENCE

BACKGROUND OF THE DISCLOSURE

The embodiments described herein relate generally to electric motors, and more specifically, to reducing conducted electromagnetic interference (EMI) in electric motors.

At least some known electronic devices include electrical lines that produce unwanted electrical noise. Such electrical noise can adversely affect other electronic circuit components either within the electronic device itself or in nearby external electronic devices. Conducted EMI is an electrical noise current which is typically present in the radio-wave frequency range. This current originates from within a system of electrical devices rather than from an outside source such as a radio signal transmitter. Electric power supplies of electric motors are known to be significant generators of EMI. In connection with electric power supplies, EMI is undesirable because, for example, it can disturb the operation or degrade the performance of other equipment connected to the same source of power.

In residential and industrial applications, federal regulations have required manufacturers to control conducted EMI generated by power electronic devices. To reduce EMI in electric motors, at least some manufacturers connect large, bulky EMI filters to a motor controller of the electric motor. However, as a demand for smaller, more compact electric motors increases, manufacturers are limited in EMI filter design, size, and cost.

BRIEF DESCRIPTION

In one aspect, a drive circuit is provided for reducing conducted electromagnetic interference (EMI) provided by a power line to a motor controller. The power line includes a first alternating current (AC) line output and a second AC line output. The drive circuit includes an EMI filter having a first input terminal, a second input terminal, a first output terminal, and a second output terminal. The first input terminal is configured to be coupled to the first AC line output and the second input terminal is configured to be coupled to the second AC line output. The drive circuit further includes at least two series-coupled filter capacitors positioned between the EMI filter and the motor controller and a power factor correction (PFC) choke. The PFC choke is coupled at a first end to the second output terminal and at a second end between the series-coupled filter capacitors.

In another aspect, a method is provided for assembling a motor controller, wherein the motor controller is coupled to a power line. The power line includes a first AC line output and a second AC line output. The method includes providing an EMI filter having a first input terminal, a second input terminal, a first output terminal, and a second output terminal. The first input terminal is configured to be coupled to the first AC line output and the second input terminal is configured to be coupled to the second AC line output. The method further includes coupling at least two filter capacitors in series between the EMI filter and the motor controller, and coupling a PFC choke to the second output terminal and to a common node between the series-coupled filter capacitors.

In yet another aspect, a motor control system is provided for reducing conducted EMI provided by a power line to an electric motor. The power line includes a first AC line output and a second AC line output. The motor control system includes a motor controller and a drive circuit. The drive circuit includes an EMI filter having a first input terminal, a second input terminal, a first output terminal, and a second output terminal. The first input terminal is configured to be coupled to the first AC line output and the second input terminal is configured to be coupled to the second AC line output. The drive circuit further includes at least two series-coupled filter capacitors positioned between the EMI filter and the motor controller and a power factor correction (PFC) choke. The PFC choke is coupled at a first end to the second output terminal and at a second end between the series-coupled filter capacitors.

DETAILED DESCRIPTION

The methods and systems described herein facilitate reducing conducted electromagnetic interference (EMI) in a motor drive controller. EMI is reduced by positioning a power factor correction choke after an EMI filter and in line with a voltage doubling jumper wire.

Figure 1:
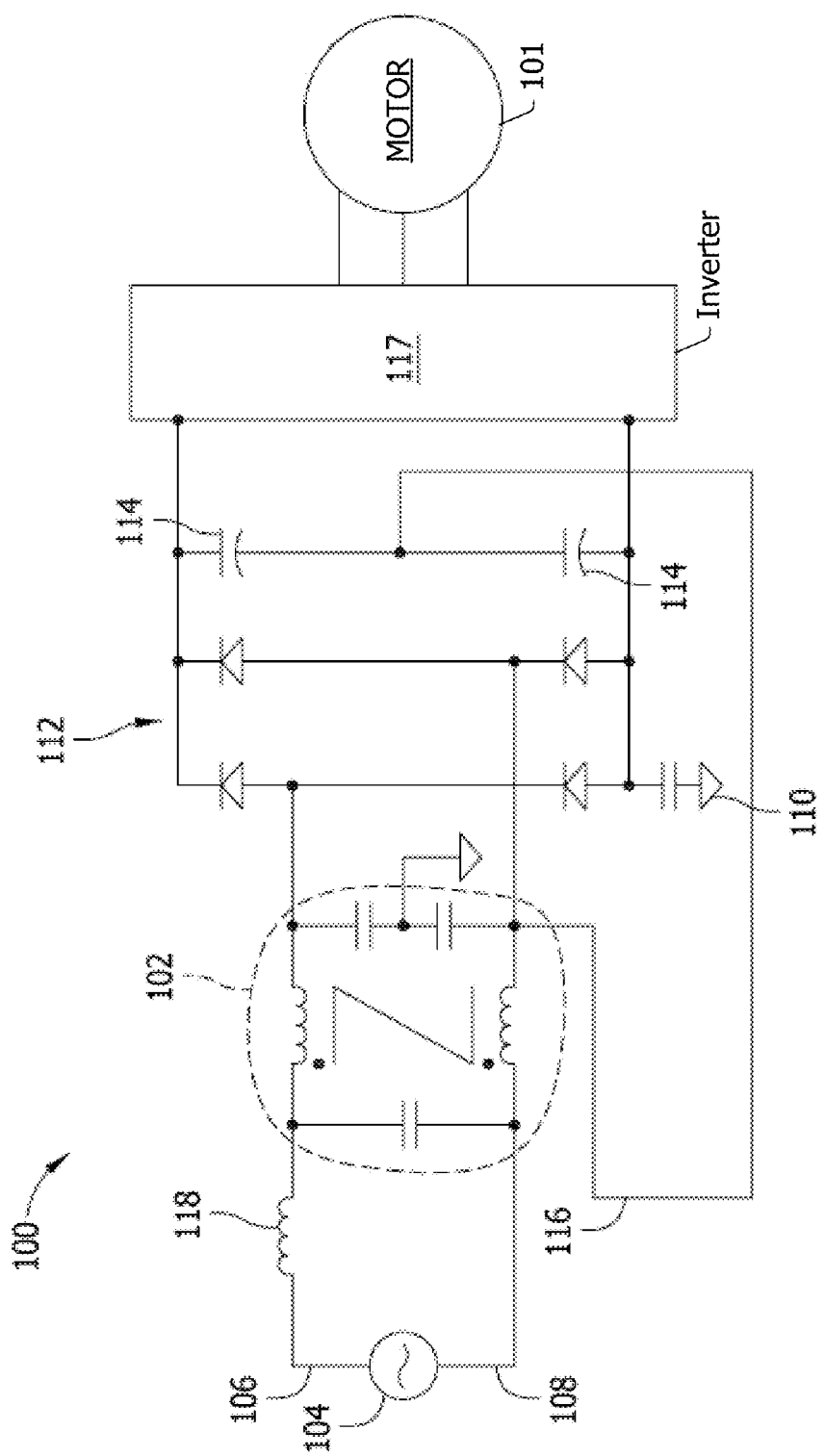
FIG. 1 is a circuit diagram of a front end of a known motor controller for an electric motor that includes an electromagnetic interference (EMI) filter.

FIG. 1 is a circuit diagram of a known motor controller 100 for an electric motor 101 that includes an EMI filter 102. Motor controller 100 is coupled to a power supply 104, which is a single phase alternating current (AC) power supply that inputs AC power to a line conductor 106 and a neutral conductor 108 of electric motor 101. Power supply 104 is also coupled to earth ground 110. Power supply 104 may produce either 120 volts (V) RMS or 240 VRMS depending on the requirements of electric motor 101.

Motor controller 100 further includes a rectifier 112 for rectifying or converting the AC power from power supply 104 to a direct current (DC) power usable to control the motor. At least some modern 240 V electric motors can operate at either on a 120 VRMS or a 240 VRMS input. For the 120 VRMS application, motor controller 100 includes filter capacitors 114 coupled to a jumper wire 116. Together, filter capacitors 114 and jumper wire 116 create a voltage doubler that doubles the 120 VRMS input to a 240 V output used to control electric motor 101. Motor controller 100 may also include an inverter portion 117 for inverting the rectified power to three-phase power for operating electric motor 101.

Motor controller 100 further includes a power factor correction (PFC) choke 118 for reducing harmonic components of the current being drawn into rectifier 112. PFC choke 118 comprises an inductor and is located on line conductor 106 before EMI filter 102. For the 120 VRMS application, current flowing through motor controller 100 is greatly increased as compared to a 240 VRMS input because only half the voltage is provided to a motor drawing the same amount of power.

PFC choke 118 is configured to improve a power factor of electric motor 101 by reducing the amplitude of the peak current, thereby reducing losses in the supply current. However, positioning PFC choke 118 on line conductor 106 causes an asymmetric correction of the EMI voltage from line conductor 106 to earth ground 110 when compared to the EMI voltage from neutral conductor 108 to earth ground 110.

Figure 2:
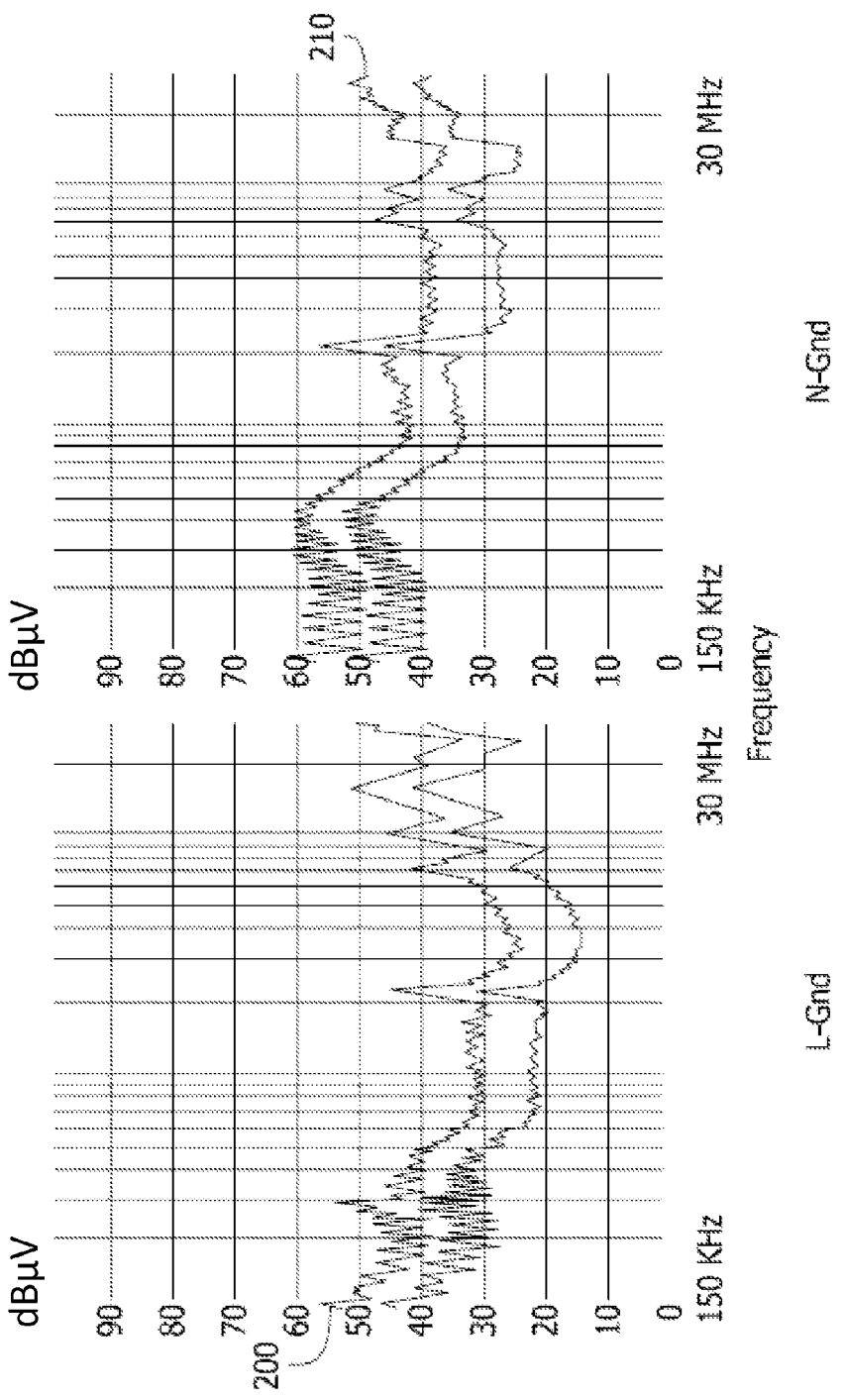
FIG. 2 is a graph comparing EMI voltage measured from the line conductor to earth ground to EMI voltage from the neutral conductor to earth ground in the motor controller shown in FIG. 1.

FIG. 2 is a graph comparing EMI voltage 200 measured from line conductor 106 (shown in FIG. 1) to earth ground 110 (shown in FIG. 1) to EMI voltage 210 from neutral conductor 108 (shown in FIG. 1) to earth ground 110 in the motor controller shown in FIG. 1. As is seen in FIG. 2, EMI voltage 200 is much lower than EMI voltage 210 for frequencies between 150 kHz and 30 MHz. For example, at approximately 450 kHz, EMI voltage 210 is approximately 6 dBµV higher than EMI voltage 200. This asymmetric correction of EMI is due to PFC choke 118 (shown in FIG. 1) being located on line conductor 106 (shown in FIG. 1), as EMI in neutral conductor 108 (shown in FIG. 1) is not affected by PFC choke 118.

Figure 3:
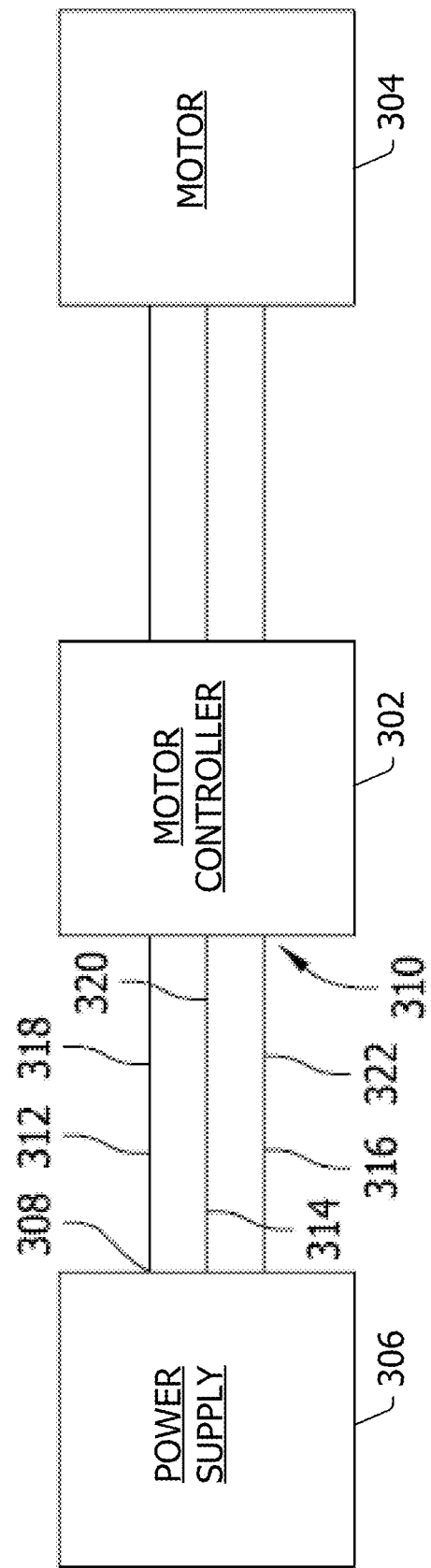
FIG. 3 is a block diagram of an exemplary embodiment of an electric motor system that includes a motor controller.

FIG. 3 is a block diagram of an exemplary embodiment of an electric motor system 300 that includes a motor controller 302. In the exemplary embodiment, motor controller 302 is coupled to an electric motor 304. Although illustrated as separate components, motor controller 302 and electric motor 304 may be included within a single housing. Motor controller 302 provides electric motor 304 with operating signals, for example, but not limited to, a sine wave operating signal, a square wave operating signal, or any other suitable operating signal that allows system 300 to function as described herein. The operating signals direct operation of electric motor 304.

In the exemplary embodiment, electric motor system 300 also includes a power supply 306. While described herein as a one-hundred and twenty volt alternating current (AC) power supply or a two-hundred and forty volt AC power supply, power supply 306 is not limited to this. Power supply 306 may be a four-hundred forty to four-hundred sixty volt power supply or any other suitable power supply that enables system 300 to function as described herein. An output power line 308 of power supply 306 is coupled to an input 310 of motor controller 302. In the exemplary embodiment, motor controller 302 converts the AC voltage from power supply 306 to a direct current (DC) voltage used to drive electric motor 304. In the exemplary embodiment, output power line 308 includes three conductors: a first line conductor 312, a second line conductor 314, and a ground conductor 316. In some embodiments, first line conductor 312 is referred to as L1 and second line conductor 314 is referred to as L2 or a neutral conductor. Ground conductor 316 is typically coupled to earth ground. However, ground conductor 316 may be coupled to a chassis ground or any other grounding that allows system 300 to function as described herein.

In the exemplary embodiment, input 310 of motor controller 302 includes a first AC line output terminal 318 for coupling motor controller 302 to first line conductor 312. Input 310 also includes a second AC line output terminal 320 for coupling motor controller 302 to second line conductor 314. Furthermore, input 310 includes a ground terminal 322 for coupling motor controller 302 to ground conductor 316. In some embodiments, second AC line output terminal 320 may also be referred to as neutral line output terminal 320.

Figure 4:
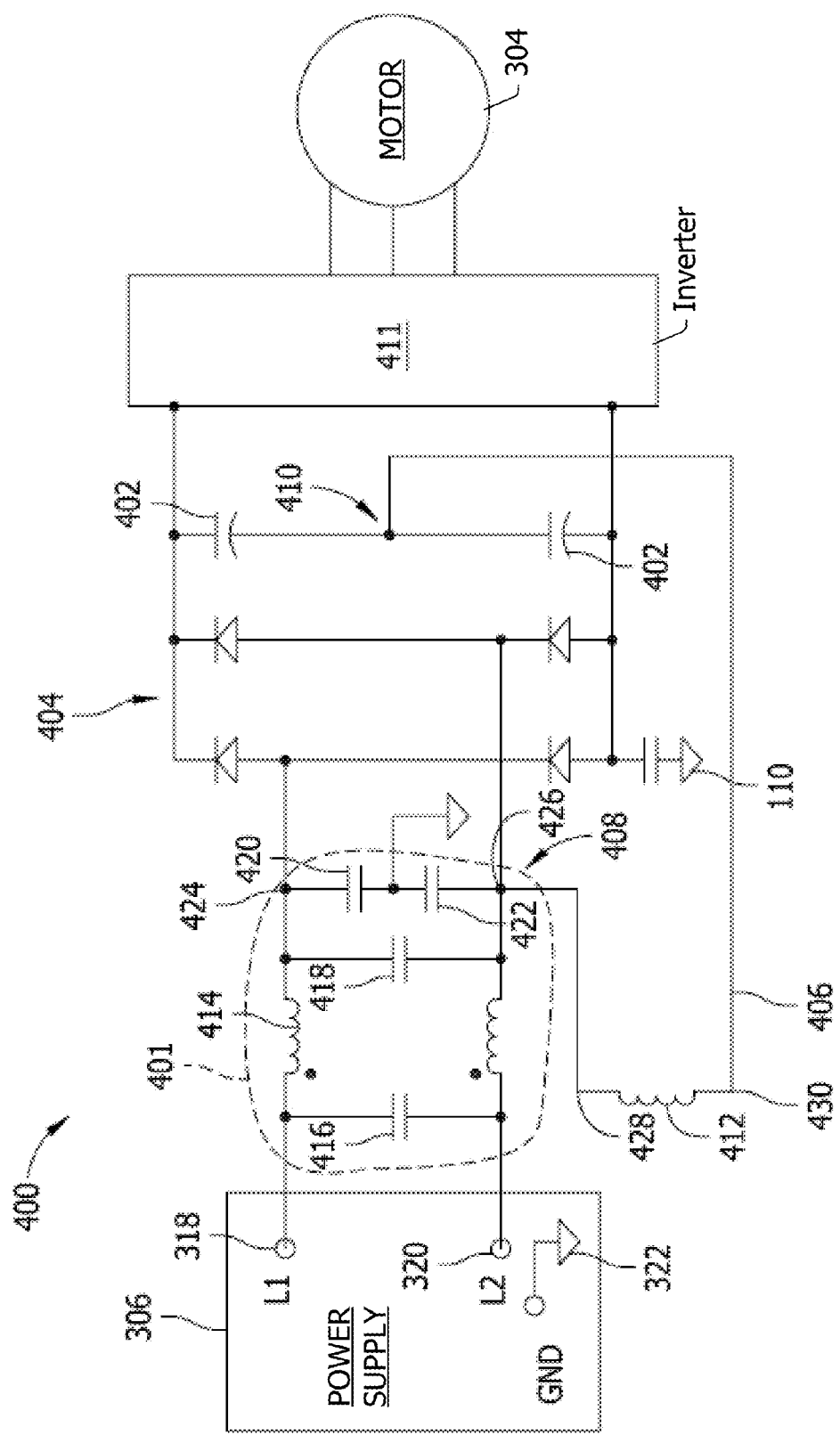
FIG. 4 is a block diagram of an exemplary embodiment of a topology of a motor controller in accordance with the present invention.

FIG. 4 is a block diagram of an exemplary embodiment of a motor controller 302 (shown in FIG. 3) that includes a drive circuit 400. In the exemplary embodiment, drive circuit 400 is coupled between power supply 306 (shown in FIG. 3) and electric motor 304 (shown in FIG. 3) and is configured to reduce conducted EMI in motor controller 302. In the exemplary embodiment, drive circuit 400 includes an electromagnetic interference (EMI) filter circuit 401, at least two series-coupled filter capacitors 402 positioned after filter circuit 401, a rectifier portion 404 coupled between filter circuit 401 and filter capacitors 402, a jumper wire 406 that includes a first end 408 and a second end 410, and at least one power factor correction (PFC) choke 412 coupled to jumper wire 406. First end 408 of jumper wire 406 is coupled between filter circuit 401 and rectifier portion 404 and second end 410 is coupled between filter capacitors 402. Drive circuit 400 may also include an inverter portion 411 for inverting the rectified power to three-phase power for operating electric motor 304.

In the exemplary embodiment, EMI filter circuit 401 includes at least one common mode inductor 414, also referred to as a common mode choke, and one or more capacitors, for example, a first capacitor 416, a second capacitor 418, a third capacitor 420, and a fourth capacitor 422. In the exemplary embodiment, EMI filter circuit 401 is configured to condition electricity provided to motor controller 302. For example, EMI filter circuit 401 is configured to suppress EMI within system 300. In the exemplary embodiment, input 310 (shown in FIG. 3) of EMI filter circuit 401 includes first AC line output terminal 318 (shown in FIG. 3) for coupling motor controller 302 to first line conductor 312 (shown in FIG. 3). Input 310 also includes second AC line output terminal 320 (shown in FIG. 3) for coupling motor controller 302 to second line conductor 314 (shown in FIG. 3). Furthermore, input 310 includes a ground terminal 322 for coupling motor controller 302 to ground conductor 316. EMI filter circuit 401 also includes a first output terminal 424 and a second output terminal 426.

In the exemplary embodiment, rectifier portion 404 is coupled to first and second output terminals 424 and 426 of filter circuit 401. Rectifier portion 404 is positioned after EMI filter circuit 401. More specifically, rectifier portion 404 is positioned between EMI filter circuit 401 and filter capacitors 402. Rectifier portion 404, for example, a bridge rectifier, converts an AC power input to a DC power output. The output from rectifier portion 404 constitutes a pulsating DC signal that is sent to filter capacitors 402.

In the exemplary embodiment, at least two filter capacitors 402 are coupled in series after EMI filter circuit 401. Filter capacitors 402 capture a peak voltage level from each pulse from rectifier portion 404, enabling filter capacitors 402 to remove ripple from the output of rectifier portion 404.

In the exemplary embodiment, jumper wire 406 is coupled at first end 408 after EMI filter circuit 401 and before rectifier portion 404. More specifically, first end 408 is coupled at second output terminal 426 and second end 410 is coupled between filter capacitors 402. In the exemplary embodiment, for an electric motor that operates at 240V, when first line conductor 312 (shown in FIG. 3) and second line conductor 314 (shown in FIG. 3) are provided with 120 VAC, jumper wire 406 creates a voltage doubler in drive circuit 400 to double the input voltage to 240V.

In the exemplary embodiment, PFC choke 412 comprises a first end 428 and a second end 430. PFC choke 412 comprises an inductor and is located in line with jumper wire 406. Positioning PFC choke 412 in line with jumper wire 406, i.e., after EMI filter circuit 401, improves the power factor of the electric motor and also produces symmetric EMI voltage correction between first line output terminal 318 and ground terminal 322, and between second line output terminal 320 and ground terminal 322. PFC choke 412 is configured to reduce harmonic components of the current being drawn into rectifier portion 404. In the exemplary embodiment, power factor correction is only necessary for 120 VAC inputs due to the higher current in drive circuit 400. For 240 VAC inputs, the PFC choke may be placed either in line conductor 312 or neutral conductor 314. Alternatively, the reduced line current due to the higher voltage may not require power factor correction in drive circuit 400.

Figure 5:
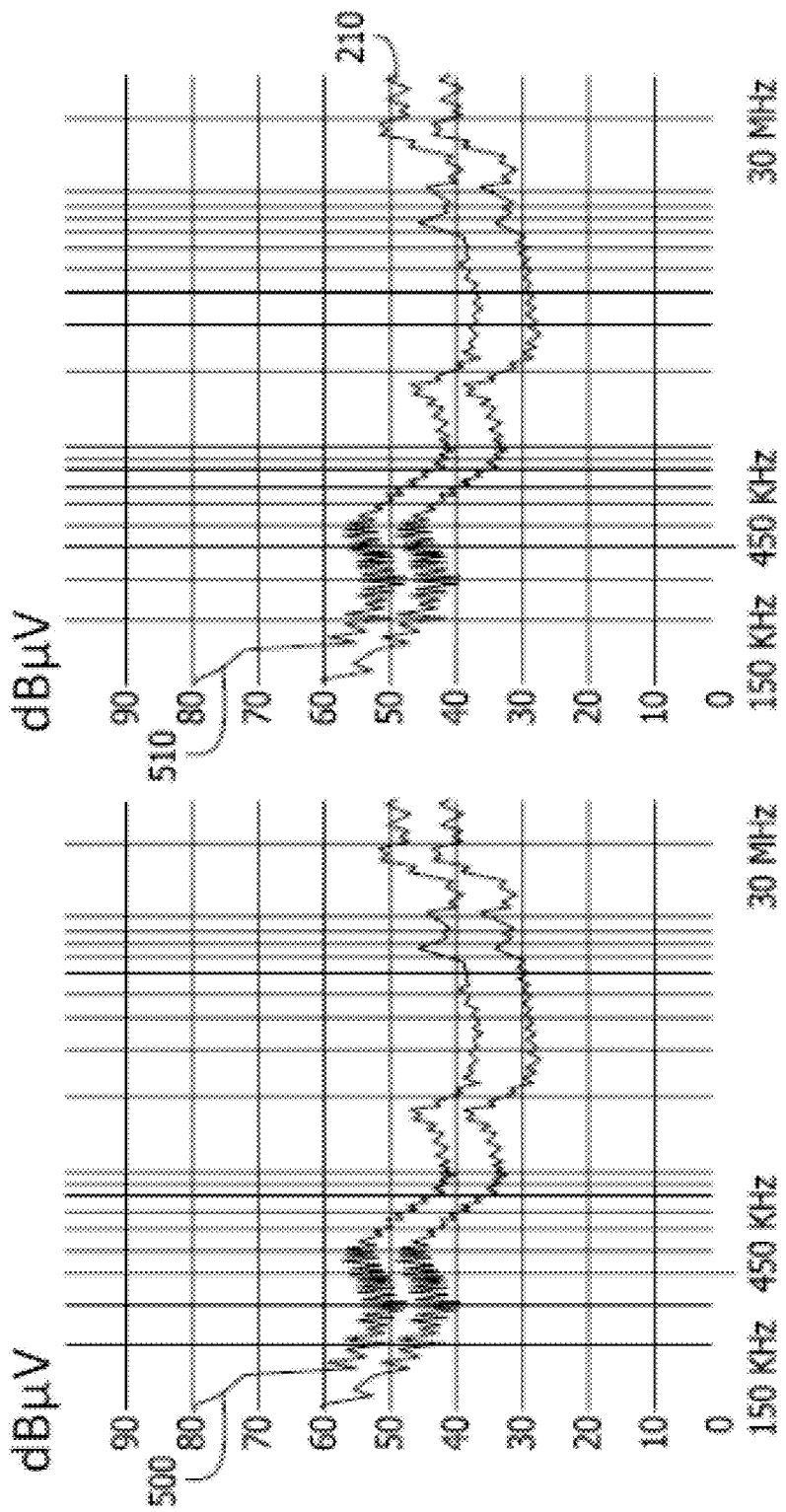
FIG. 5 is a graph comparing EMI voltage measured from the line conductor to earth ground to EMI voltage measured from the neutral conductor to earth ground in the drive circuit shown in FIG. 4.

FIG. 5 is a graph comparing EMI voltage 500 measured from the first line input terminal to the ground terminal to EMI voltage 510 measured from the second line input terminal to the ground terminal in the drive circuit shown in FIG. 4. As is shown in FIG. 5, placing PFC choke 412 (shown in FIG. 4) in line with jumper wire 406 (shown in FIG. 4) after EMI filter circuit 401 provides symmetric EMI correction. For example, between about 100 kHz and about 30 MHz, EMI voltage 510 measured from second line input terminal 320 (shown in FIGS. 3 and 4) to ground terminal 322 (shown in FIGS. 3 and 4) is reduced by approximately 4 dBµV to approximately 8 dBµV as compared to the motor controller shown in FIG. 1. In other embodiments, EMI reduction may be greater depending on the input voltage and the size of the motor being used.

Described herein are exemplary methods, systems, and an apparatus for reducing conducted EMI in a motor drive controller. EMI is reduced by positioning a power factor correction choke after an EMI filter and in line with a voltage doubling jumper wire.

The methods, systems, and apparatus described herein facilitate efficient and economical EMI reduction in a variable speed drive. Exemplary embodiments of methods, systems, and apparatus are described and/or illustrated herein in detail. The methods, systems, and apparatus are not limited to the specific embodiments described herein, but rather, components of each system and/or apparatus, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive circuit for electromagnetic interference (EMI) reduction of power provided by a power line to a motor controller, the power line comprising at least a first alternating current (AC) line output and a second AC line output, said drive circuit comprising:
   an EMI filter having at least a first input terminal, a second input terminal, a first output terminal, and a second output terminal, said first input terminal configured to be coupled to the first AC line output and said second input terminal configured to be coupled to the second AC line output;
   at least two series-coupled filter capacitors positioned after said EMI filter;
   a rectifier portion comprising a first rectifier input terminal coupled to said first output terminal and a second rectifier input terminal coupled to said second output terminal; and
   a power factor correction (PFC) choke comprising a first end and a second end, said first end coupled to said second output terminal and to said second rectifier input terminal, said second end coupled between said at least two series-coupled filter capacitors.

2. A drive circuit in accordance with claim 1, wherein said rectifier portion is positioned between said EMI filter and said at least two series-coupled filter capacitors.

3. A drive circuit in accordance with claim 1, further comprising a jumper wire coupled to said second output terminal and between said at least two series-coupled filter capacitors.

4. A drive circuit in accordance with claim 3, wherein said PFC choke is coupled to said jumper wire.

5. A drive circuit in accordance with claim 1, wherein said PFC choke is configured to produce symmetric EMI voltage distribution between the first AC line output and ground, and the second AC line output and ground.

6. A drive circuit in accordance with claim 1, wherein said EMI filter comprises a common mode choke and at least one capacitor.

7. A method for assembling a motor controller, wherein the motor controller is coupled to a power line comprising at least a first alternating current (AC) line output and a second AC line output, said method comprising:
   providing an EMI filter having at least a first input terminal, a second input terminal, a first output terminal, and a second output terminal, the first input terminal configured to be coupled to the first AC line output and the second input terminal configured to be coupled to the second AC line output;
   coupling at least two filter capacitors in series after the EMI filter;
   coupling a rectifier portion to the EMI filter, the rectifier portion including a first rectifier input terminal coupled to the first output terminal and a second rectifier input terminal coupled to the second output terminal; and
   coupling a first end of a power factor correction (PFC) choke to the second output terminal and to the second rectifier input terminal, and a second end of the PFC choke to a common node between the at least two series-coupled filter capacitors.

8. A method in accordance with claim 7, wherein coupling the rectifier portion further comprises coupling the rectifier portion between the EMI filter and the at least two series-coupled filter capacitors.

9. A method in accordance with claim 7, further comprising coupling a jumper wire to the second output terminal and to a common node between the at least two series-coupled filter capacitors.

10. A method in accordance with claim 9, further comprising coupling the PFC choke to the jumper wire.

11. A method in accordance with claim 7, further comprising configuring the PFC choke to produce symmetric EMI voltage distribution between the first AC line output and ground, and the second AC line output and ground.

12. A method in accordance with claim 7, wherein providing the EMI filter comprises providing a common mode choke coupled to at least one capacitor.

13. A motor control system for electromagnetic interference (EMI) reduction of power provided by a power line to an electric motor, the power line comprising at least a first alternating current (AC) line output and a second AC line output, said motor control system comprising:
   a motor controller; and
   a drive circuit comprising:
      an EMI filter having at least a first input terminal, a second input terminal, a first output terminal, and a second output terminal, said first input terminal configured to be coupled to the first AC line output and said second input terminal configured to be coupled to the second AC line output;
      at least two series-coupled filter capacitors positioned after said EMI filter;
      a rectifier portion comprising a first rectifier input terminal coupled to said first output terminal and a second rectifier input terminal coupled to said second output terminal; and
      a power factor correction (PFC) choke comprising a first end and a second end, said first end coupled to said second output terminal and to said second rectifier input terminal, said second end coupled between said at least two series-coupled filter capacitors.

14. A motor control system in accordance with claim 13, wherein said rectifier portion is positioned between said EMI filter and said at least two series-coupled filter capacitors.

15. A motor control system in accordance with claim 13, further comprising a jumper wire coupled to said second output terminal and between said at least two series-coupled filter capacitors, wherein said PFC choke is coupled to said jumper wire.

16. A motor control system in accordance with claim 13, wherein said PFC choke is configured to produce symmetric EMI voltage distribution between the first AC line output and ground, and the second AC line output and ground.

17. A motor control system in accordance with claim 13, wherein said EMI filter comprises a common mode choke and at least one capacitor.

* * * * *